United States Patent Office 3,416,953
Patented Dec. 17, 1968

3,416,953
REFRACTORY FIBERS AND METHOD OF PREPARING SAME
Carlos L. Gutzeit and Henry J. Brown, Long Beach, Calif., assignors to Hitco, a corporation of Delaware
No Drawing. Filed Jan. 23, 1964, Ser. No. 339,614
32 Claims. (Cl. 117—126)

ABSTRACT OF THE DISCLOSURE

Improved zirconia, zircon and silica fibers having increased wettability and bondability with resinous bonding agents and high temperature stability are prepared by treating the fibers with an agent selected from the group consisting of chromic acid, phosphoric acid and mixtures thereof and heat treated at a temperature of at least about 1450° F. for a time sufficient to cause the formation of an improved surface layer on the fibers.

---

The present invention generally relates to refractory fibers and more particularly relates to improved refractory fibers such as zirconia and silica and to methods of preparing the fibers.

High silica content fibers containing up to 95 percent or more silica have a number of superior characteristics which particularly adapt them for use in high temperature environments. Thus, such fibers have been effectively used in the fabrication of reentry shields, rocket nozzles, jet liners and the like because such fibers have very high softening points, are extremely stable chemically and can be easily fabricated into products having particularly good ablative properties (erosion resistance). Thus, structures fabricated from such silica fibers can be exposed to temperatures as high as 15,000° F. for very short periods of time without loss of integrity. High silica content fibers have been successfully employed in the form of woven textiles, rovings, cordage, batts, bulk fibers and the like for a variety of purposes. Thus, the fibers have been used as structural reinforcements in laminated or other solid bodies intended to be exposed to extremely high temperature gases. Also, they have been used as thermal insulating components and hot gas and molten metal filtration elements.

High silica content fibers containing 96% or more silica, and usually up to about 99% or more, can be prepared from glass fibers by a method such as that described in U.S. Patent No. 2,491,761 to Parker et al. The glasses which are preferred for conversion to the high silica content fibers are high alumina, high lime content glasses. However, other types of glasses can be used.

As set forth in Patent No. 2,491,761 and in copending United States patent application Serial No. 50,859, filed August 22, 1960, now U.S. Patent No. 3,262,767 for "Method for Preparing Vitreous Silica Products," of which Eugene C. S. Wang is the inventor (that application having been assigned to the assignee of the present invention), glass fibers are leached in a suitable acid. The acid may be hydrochloric, sulfuric, nitric, acetic, chloroacetic or the like acid which removes glass-forming oxides except silica. Thereafter, the fibers are removed from the bath, washed free of acid, dried, and then fired at a suitable temperature, for example about 1800° F., to drive off water of hydration and to shrink the fibers.

The finished high silica content fibers usually have a diameter of about 0.001 inch or less. In many such instances it is desirable to bond the small diameter silica fibers together through the use of selected resinous bonding agents or the like. However, it has been found that it is generally difficult to fully wet the surfaces of the fibers with the bonding agent so as to assure permanent and effective bonding throughout the fiber mass or body. Accordingly, improvements in the wettability and the bondability of the high silica content fibers have been diligently sought.

Newer refractory fibers, such as zirconia fibers and zircon fibers of generally circular cross section and of relatively small diameter have also been proposed for high temperature use. Zirconia fibers and zircon fibers are polycrystalline ceramic fibers which comprise individual grains fused together without an amorphous or glassy phase at the grain boundaries.

Various types of generally round zirconia-containing fibers of substantial length are commercially available. They include: (1) those zirconia fibers which contain about 94%, by weight, zirconia and about 6% by weight, of calcium-containing stabilizer (commercially known as Zirconia A fibers); (2) zirconia C fibers, which contain about 89%, by weight, of zirconia, with the balance consisting essentially of silica as a stabilizer; (3) zirconia E fibers which contain about 94%, by weight, of zirconia, the balance essentially being neodymium-containing stabilizer; and, (4) zircon fibers containing about 66%, by weight, of crystals of zircon which has the structural formula $ZrO_2 \cdot SiO_2$.

Zirconia fibers in the unstabilized form are also available but are not per se stable at elevated temperatures of, for example, about 1200° F.–2000° F. However, the calcium-containing, neodymium-containing and silica stabilizers of the zirconia A, C and E fibers, respectively, have the effect of stabilizing the crystals structure of the zirconia, thus preventing its breakdown and consequent loss of strength and integrity at elevated temperatures. In this regard, the calcium and neodymium are frequently referred to as if they are present in the oxide form, but it is believed that each may be present as the chloride salt. At any rate, they apparently stabilize the crsytal structure of the zirconia to the cubic form, while the silica apparently prevents any change in crystal structure. The zircon crystal is also resitant to change, even at elevated temperatures of, for example, about 1200° F.–2000° F., and, accordingly, zircon fibers do not require stabilizers.

Zirconia fibers can be prepared by any suitable method, such as that set forth in copending United States patent application, Serial No. 179,836, filed March 1, 1962, for "Refractory Fibers and Methods of Making the Same," now U.S. Patent No. 3,311,481 of which John Patrick Sterry and Anton Skurcenski are the inventors, said application having been assigned to the assignee of the present invention. As set forth in that copending United States patent application, Serial No. 179,836, zirconia fibers are prepared from suitable syrups which are concentrated and then spun out to generally circular fiber form. The fibers are then stabilized in shape, dried and then heat treated, in accordance with a special series of heat treating steps, to above the gel-breaking point so as to form the desired fibrous, non-glassy polycrystalline structure.

The heat treating step can be carried out up to a temperature limit of about 1100° F.–1150° F. A final firing (heat shrinking or heat conditioning) step can then be carried at a higher temperature, for example, about 1500° F.–1800° F. However, in such instance the zirconia fiber needs first to be stabilized, as indicated previously, by the addition thereto of one or more of the above-identified stabilizers. Such addition, of course, is carried out when the fiber spinning syrup is prepared.

Zircon fibers can be formed in the same manner as the zirconia fibers by initially utilizing a syrup mixture which yields an equimolar concentration of zirconia and silica so as to provide in the finished product an essentially pure crystalline zircon, i.e., $ZrO_2 \cdot SiO_2$.

Zirconia fibers melt at temperatures between 4600° F. and 4900° F. while zircon fibers melt at about 4200° F. Both types of fibers undergo little or no change when exposed to temperatures between 2400° F. and 3500° F. for extended periods of time, except that where unstabilized zirconia fibers are utilized, their fibrous nature breaks down at temperatures in excess of about 1150° F. Accordingly, stabilized zirconia fibers and zircon fibers represent a compromise between standard vitreous high silica fibers and experimental single crystal fibers. They are highly useful for a variety of high temperature uses, such as in the fabrication of components for reentry vehicles, rocket nozzles, rocket exhaust parts, etc. In this regard, they can be laminated and molded and are currently available in the form of wool, felt, batts and the like.

However, difficulties have arisen in obtaining complete wetting and bonding of zirconia fibers and also zircon fibers with resinous bonding materials during fabrication of resin bonded products. Moreover, unstabilized zirconia fibers cannot be used at elevated temperatures (above 1100° F.–1150° F.) without losing their integrity. Accordingly, it would be highly desirable to be able to improve the resin wettability and bondability of zirconia fibers, zircon fibers and also the previously described silica fibers, and to simultaneously improve the high temperature stability of previously unstabilized zirconia fibers. The general class of fibers to which the present invention relates can be characterized as those refractory fibers which are difficultly resin wettable and bondable and which contain at least about 50 percent of at least one oxide selected from the group consisting of zirconia and silica.

Accordingly, it is a principal object of the present invention to provide improved refractory fibers. It is also an object of the present invention to provide a method of improving the resin wettability and bondability of selected refractory fibers. It is a further object of the present invention to improve the resin wettability and bondability of zirconia fibers, zircon fibers and silica fibers, and also the heat stability of previously unstabilized zirconia fibers.

It is also an object of the present invention to provide improved zirconia fibers, zircon fibers and silica fibers exhibiting both increased wettability and bondability with resinous bonding agents and high temperature stability. It is a still further object of the present invention to provide a method of treating silica fibers, zirconia fibers and zircon fiber so as to rapidly, economically and efficiently improve the resin wettability and bondability thereof, and to simultaneously heat stabilize those zirconia fibers which were not previously heat stabilized.

The foregoing objects are accomplished, in accordance with the present invention, by providing a method of treating the surfaces of stabilized and unstabilized zirconia fibers, zircon fibers and silica fibers with an agent selected from the group consisting of chromic acid, phosphoric acid and mixtures thereof. The agent improves the resin wettability and bondability of both unstabilized and stabilized zirconia fibers, zircon fibers and silica fibers and also improves the heat stability of unstabilized zirconia fibers. The criterion of good resin wetting is the formation of a continuous coating of the resin on the surface of each fiber in contrast to coalescence and "beading" to form spherical drops and other discontinuous patches of the resin on the fiber surface. Good resin bondability is the ability to easily and effectively form a strong permanent bond with the resin. By increased heat stability is meant increased resistance to structural degradation at temperatures above about 1100° F.

As a specific example, stabilized zirconia fibers, previously fired at 1800° F. and containing about 6 percent, by weight, of calcium stabilizer disposed mainly on the surface thereof, apparently in the form of calcium chloride, are immersed in a 0.1 mol chromic acid solution for a 20 minute period, and agitated occasionally. The fibers are then removed from the chromic acid, drained, dried and again fired at 1800° F. The finished fibers are then tested in the following manner:

They are saturated with a solution of phenolic resin diluted with an equal amount (by weight) of isopropanol as solvent, drained to remove excess resin solution, heated to 200° F. to remove the solvent, and the dried fibers are then examined under a microscope to determine the degree of resin coating. In each instance good wetting is present, as exhibited by the formation of a continuous coating of the resin over essentially the entire surface of each fiber. All fibers appear to be fully coated and only a few beads of free resin are present.

Further objects and advantages of the present invention will be apparent from a study of the following detailed description.

Referring now more particularly to the steps of the present method, fibers selected from the group consisting of zirconia fibers, silica fibers and zircon fibers are contacted with a treating agent which improves the resin wettability and bondability of the fibers, and also the high temperature stability of unstabilized zirconia fibers. The zirconia fibers can be heat stabilized fibers or unstabilized fibers. In the case of the stabilized fibers, the stabilizer may be any suitable stabilizer in any suitable concentration, for example, calcium (salt or oxide) in a concentration, of about 11%, by weight, or neodymium (salt or oxide) in a concentration of, about 6%, by weight. Alternatively, the zirconia fibers may contain silica, in a concentration of, for example, 11% by weight, as stabilizer. It is believed that such stabilizer is present almost entirely on the surface of the fibers and that in the case of the calcium and the neodymium, the stabilizer is probably present as the chloride, i.e., calcium chloride or neodymium chloride, rather than as the oxide.

The treating agent, in accordance with the present invention, is selected from the group consisting of chromic acid, phosphoric acid, and mixtures thereof. Such acid is utilized in a concentration sufficient to treat the exposed surfaces of the fibers, preferably to substantially completely treat such surfaces. It has been found that concentrations of the acid of the order of about 0.1 mole are sufficient for most purposes. Chromic acid and phosphoric acid can be and preferably are utilized in a suitable medium, such as water, at the desired concentration level, in order to facilitate their uniform distribution on the surface of the fibers to be treated.

The contacting of the refractory fibers with the treating agent can take place in any suitable manner, as by spraying the treating agent on the fibers, or by immersing the fibers in the treating agent, etc. Uniform distribution of the treating agent on all the exposed surfaces of the fibers is desired, and the contacting time is preferably regulated so as to assure saturation of the fibers with the treating agent, after which the fibers and excess treating agent are separated from one another. For example, the fibers can be immersed for 5–30 minutes in a tank containing an aqueous solution of the treating agent with intermittent agitation to assure that all fibers are saturated with the solution. Thereafter, the fibers can be withdrawn from the tank, allowed to drain free of excess treating agent and then heat treated at a temperature sufficiently high to assure formation of an improved surface layer on the fibers. In some instances (zircon fibers and zirconia fibers stabilized with calcium or neodymium or unstabilized) this involves a reaction between the treating agent and the surfaces of the fibers. In other instances (silica fibers and silica stabilized zirconia fibers) this involves deposition of the treating agent as a separate layer on the fiber surface. In all instances the improved surface layer incorporates material from the treating agent (chromium and/or phosphorus).

This can be accomplished by heating the fibers to a temperature of at least about 1450° F., and preferably about 1600° F.–2000° F. The elevated temperature (firing temperature) is maintained for a period of time sufficient to assure an adequate degree of formation of the improved surface layer from the treating agent and, in some instances, the substance of the original fiber surfaces. Preferably at least a substantial completion of such formation is effected. A period of less than one minute at, for example, 1800° F.–2000° F. is usually sufficiently long to assure substantial completion of the formation. Upon cooling to ambient temperature, the fibers are then ready for use. They are characterized by having an improved surface layer which maximizes both the resin wettability and bondability and the heat stability of the fibers.

The treating agent, whether it be the chromic acid or the phosphoric acid or a mixture thereof, chemically reacts with the stabilizer, except silica stabilizer, which is disposed on the zirconia fiber surface or, in the absence of such stabilizer, with the zirconia itself. In the case of the zircon, the treating agent also reacts with the zirconia, and in the case of the silica-stabilized zirconia and the silica fibers, the treating agent or a portion thereof apparently plates out on and strongly adheres to the silica surface without chemical reaction therewith. Thus, for example, when chromic acid is used, there is a chemical reaction between the chromium and the calcium at the surface of calcium-stabilized zirconia fibers. Similarly, there is a reaction between the chromium and the neodymium at the surface of neodymium stabilized zirconia fibers. In the case of the silica stabilized zirconia fibers and the silica fibers there is a direct physical bonding of the chromium (probably as $CrO_3$) to the silica surface. In the case of the zircon fibers, there is a chemical reaction between the zirconia and the chromium. Similar reactions and bonding are believed to take place between the phosphorus of phosphoric acid when this is used as the treating agent, and the surfaces of the described stabilized and unstabilized fibers.

The net result in all cases is the production of an improved surface layer which enhances the wettability and bondability of the fiber surface to various resins, such as phenolic resins and the like. An additional result in the case of the initially unstabilized zirconia fibers is heat stabilization thereof and, so that in all instances the finished treated fibers are heat stabilized for temperatures up to about the melting, softening or sublimation point thereof and have superior resin wettability and bondability.

Such improved wettability and bondability of the fibers extends to phenolic resin and to other types of resin, such as epoxy resins, silicone resins and the like. The exact manner in which the observed improvement in resin wettability and bondability is affected for the zirconia, zircon and silica fibers is not wholly understood. However, resin bondability and wettability are known to be at least somewhat dependent upon the surface characteristics of the substrate. It is believed that the treating agent changes one or several fiber surface characteristics. Moreover, it is believed that the improved surface layer provided by the present method may depend to a considerable extent for its improved resin wettability and bondability, upon its thin, non-porous and essentially continuous nature.

It is further believed that in the cases of the untreated calcium- and neodymium-stabilized zirconia fibers, poor resin wettability and bondability of the stabilizers concentrated on the surfaces of the stabilized zirconia fibers may, in part, be due to their alkalinity and that treating by the present method results in neutralization of the alkalinity. The silica stabilizer concentrated on the surface of the silica-stabilized zirconia fibers and the silica fibers also have inherently poor resin wettability and bondability, as do the zircon fibers. It is believed that in these instances, the present method results in the deposition of an improved layer on the surfaces of such fibers, which layer effectively masks the substrate and has improved resin wettability and bondability, apparently because of its thin, continuous non-porous nature. The resin wettability and bondability of the zirconia surface of the unstabilized zirconia fibers is also improved by formation of the improved, thin, continuous non-porous layer thereon by reaction between the treating agent and zirconia.

It will be understood that the observed improvement in resin wettability and bondability is reproducible and that the present invention is not limited to the described theory of the mode of formation and action of the improved layer. Certain features of the present invention are set forth in the following examples:

EXAMPLE I

The crystal structure-stabilizing efficiency of chromic acid and phosphoric acid is verified as follows:

Unstabilized zirconia fibers which have been prepared from syrup in accordance with the method set forth in copending United States application Ser. No. 179,836, filed March 1, 1962, and which have been heat treated only to a temperature of about 1100° F., also in accordance with that method, in order to convert the initial gel-type structure of the fibers into the desired polycrystalline structure, are divided into three samples. These fibers are commercially available from the assignee of the present invention and are known as unstabilized zirconia fibers.

The first sample of the above-indicated unstabilized zirconia fibers is subjected to heat treatment in excess of 1475° F. for a period of 30 minutes, after which the sample is cooled to ambient temperature and examined. It is found that the fibers have lost their fibrous form and have completely disintegrated into a fine powder.

The second sample of the unstabilized zirconia fibers is immersed in a 0.1 molar aqueous solution of chromic acid and maintained in the solution until saturated e.g. about 5 minutes, after which the sample is removed, drained, air dried at 300° F. and then heat treated at 1800° F. for 1 minute, cooled to ambient temperature and examined. The zirconia fibers of the second heated sample are found to be fibrous i.e. physically undamaged. They are then heated to 2800° F. and maintained at that temperature for 4 hours, then cooled to ambient temperature and again examined. Their physical integrity (fibrous nature) is unchanged. Accordingly, chromic acid is a suitable crystal structure stabilizer for unstabilized zirconia fibers.

The third sample of the unstabilized zirconia fibers is treated in a manner identical to that of the second sample, except that a 0.1 mol aqueous solution of phosphoric acid is substituted for the chromic acid solution. The results are identical with those obtained with the second sample, clearly indicating that phosphoric acid is also effective in heat stabilizing the crystal structure of previously unstabilized zirconia fibers.

EXAMPLE II

Various types of refractory fibers are treated by the present method. In this regard, each type is contacted with the treating agent of the present invention (by immersing each type of fiber in an aqueous solution of the agent), then is removed from contact with the agent, drained, dried at above the heating point of water, e.g. about 300° F., and subsequently fired at 1475° F.–2000° F. for about one minute. In parallel tests, either chromic acid or phosphoric acid is used as the treating agent. A control series is also provided, wherein the fibers are left untreated. The fibers treated by the present method are set forth in Table I below:

TABLE I

| | |
|---|---|
| Fiber A | Pure unstabilized zirconium dioxide fiber. |
| Fiber B | Calcium stabilized zirconia fiber having a concentration by weight of about 94% zirconia and about 6% calcium (as calcium chloride). |
| Fiber C | Silica stabilized zirconia fiber containing 33% by weight of silica and 67% by weight of zirconia. |
| Fiber D | Silica stabilized zirconia fiber containing 89% by weight of zirconia and 11% by weight of silica. |
| Fiber E | Neodymium stabilized zirconia containing about 85% by weight of zirconia and about 15% by weight of neodymium (as neodymium chloride). |
| Fiber F | Zircon fiber comprising approximately 50% by weight of zirconia and approximately 50% by weight of silica. |
| Fiber G | Essentially pure silica, at least about 99% by weight of silica. |

The treated and control fibers are then tested in order to determine the resin wettability and bondability thereof. In this regard, each sample of treated fibers is saturated with a solution comprising equal amounts (by weight) of a phenolic resin and isopropanol. The solution is then drained from the sample, and the sample is then heated to 200° F. to remove residual isopropanol. The sample is then examined microscopically to determine the degree of wetting of the fibers by the resin. Poor wetting is evidenced by a discontinuous coating of the resin on the fiber surfaces and by a tendency of the resin to "ball up" or bead. Poor wetting of the fibers surfaces results in difficulties in attempting to permanently bond the fibers and the resin. Good wetting is evidenced by a continuous, even and uniform distribution of the resin over substantially the entire surface area of the fibers and results in easy and permanent bonding of the fibers by the resin. The results of the tests are set forth in Table II below:

TABLE II

| Fiber type | Treating agent | Wettability |
|---|---|---|
| A | 0.1 m. CrO₃ | Very good coating, substantially no resin bead formation. |
| B | 0.1 m. CrO₃ | Do. |
| C | 0.1 m. CrO₃ | Do. |
| D | 0.1 m. CrO₃ | Do. |
| E | 0.1 m. CrO₃ | Do. |
| F | 0.1 m. CrO₃ | Do. |
| G | 0.1 m. CrO₃ | Do. |
| A | 0.1 m. H₃PO₄ | Very good wetting, substantially no resin bead formation. |
| B | 0.1 m. H₃PO₄ | Do. |
| C | 0.1 m. H₃PO₄ | Do. |
| D | 0.1 m. H₃PO₄ | Do. |
| E | 0.1 m. H₃PO₄ | Do. |
| F | 0.1 m. H₃PO₄ | Do. |
| G | 0.1 m. H₃PO₄ | Do. |
| A | None | Fibers coat with some difficulty and cannot be fired to above about 1,100° F.–1,150° F. and still retain structure. |
| B | do | Poor coating, much beading. |
| C | do | Poor wetting, uneven coating, much beading. |
| D | do | Do. |
| E | do | Do. |
| F | do | Do. |
| G | do | Do. |

When tests similar to those set forth in Table II are carried out, utilizing, however, in the resin wetting step a solution containing phenolic resin and isopropanol in a weight ratio of 1:3, the results are similar, except that with those fibers treated by the present method there is found an even more uniform resin coating in each instance, with even fewer, smaller and flatter beads of resin.

The above examples clearly illustrate that the method of the present invention provides zirconia fibers, silica fibers and zircon fibers with improved resin wettability and bondability and also provides previously unstabilized zirconia fibers with heat stabilization, in a simple, effective, low cost manner. Accordingly, the method provides zirconia, silica and zircon fiber products which exhibit improved high temperature properties up to about the softening, melting or sublimation point thereof. The method employs a readily available agent selected from the group consisting of chromic acid and phosphoric acid and mixtures thereof, in any suitable concentration sufficient to form the improved surface layer on the fibers. Further advantages of the present invention are as set forth in the foregoing.

Various modifications, changes, additions and substitutions can be made in the present method. All such modifications, changes, additions and substitutions as are within the scope of the accompanying claims form a part of the present invention.

What is claimed is:

1. A method of making improved refractory fibers, which method comprises the steps of coating the surface of fibers selected from the group consisting of stabilized zirconia fibers, unstabilized zirconia fibers, zircon fibers, and mixtures thereof with a treating agent selected from the group consisting of chromic acid, phosphoric acid and mixtures thereof, heating the coated fibers to a temperature of at least 1450° F. to cause the formation of an improved surface layer on said fibers, which surface layer includes material from said treating agent, whereby the resin wettability and bondability of said fibers is improved.

2. The method of claim 1 wherein said treating agent is applied at a sufficiently high concentration and sufficiently long time to substantially completely coat the entire surface area of said fibers.

3. The method of claim 2 wherein said treating agent is utilized in aqueous solution and wherein said time is in excess of about 1 minute.

4. The method of claim 3 wherein said treating agent comprises chromic acid.

5. The method of claim 4 wherein said fibers comprise stabilized zirconia fibers.

6. The method of claim 5 wherein said fibers comprise calcium stabilized zirconia fibers.

7. The method of claim 5 wherein said fibers comprise neodymium stabilized zirconia fibers.

8. The method of claim 5 wherein said fibers comprise silica stabilized zirconia fibers.

9. The method of claim 4 wherein said fibers comprise previously unstabilized zirconia fibers, said fibers after said contacting at said elevated temperature exhibiting improved structural stability at temperatures in excess of about 1100° F.

10. The method of claim 4 wherein said fibers comprise zircon fibers.

11. The method of claim 3 wherein said treating agent comprises phosphoric acid.

12. The method of claim 11 wherein said fibers comprise stabilized zirconia fibers.

13. The method of claim 12 wherein said fibers comprise calcium stabilized zirconia fibers.

14. The method of claim 12 wherein said fibers comprise neodymium stabilized zirconia fibers.

15. The method of claim 12 wherein said fibers comprise silica stabilized zirconia fibers.

16. The method of claim 11 wherein said fibers comprise unstabilized zirconia fibers, said fibers exhibiting improved structural stability at temperatures in excess of about 1100° F. after said contacting at said elevated temperature.

17. The method of claim 11 wherein said fibers comprise zircon fibers.

18. An improved fiber product comprising fibers selected from the group consisting of stabilized zirconia fibers, unstabilized zirconia fibers, zircon fibers and mixtures thereof, the fibers having an improved surface layer which includes material derived from a treating agent selected from the group consisting of chromic acid, phosphoric acid and mixtures thereof by heating said fibers with said treating agent to a temperature of at least 1450° F., said fibers exhibiting improved resin wettability and bondability, in contrast to untreated fibers, and high temperature stability.

19. The improved fiber product of claim 18 wherein said improved surface layer includes a chromium compound.

20. The improved fiber product of claim 19 whereby said fibers comprise zirconia fibers.

21. The improved fiber product of claim 20 wherein said fibers comprise calcium stabilized zirconia fibers and wherein said chromium compound includes calcium.

22. The improved fiber product of claim 20 wherein said fibers comprise neodymium stabilized zirconia fibers and wherein said chromium compound includes neodymium.

23. The improved fiber product of claim 20 wherein said fibers comprise silica stabilized zirconia fibers and wherein said chromium compound comprises chromic acid.

24. The improved fiber product of claim 19 wherein said fibers comprise zircon fibers.

25. The improved fiber product of claim 18 wherein said improved surface layer includes a phosphorus compound.

26. The improved fiber product of claim 25 whereby said fibers comprise zirconia fibers.

27. The improved fiber product of claim 26 wherein said fibers comprise calcium stabilized zirconia fibers and wherein said phosphorus compound includes calcium.

28. The improved fiber product of claim 26 wherein said phosphorus compound includes neodymium.

29. The improved fiber product of claim 26 wherein said fibers comprise previously unstabilized zirconia fibers.

30. The improved fiber product of claim 25 wherein said fibers comprise zircon fibers.

31. An improved fiber product comprising silica fibers containing at least about 96% silica, the fibers having an improved surface layer consisting of said 96% silica and material derived from phosphoric acid, by heating said fiber product coated with a composition consisting of phosphoric acid to a temperature of at least 1450° F., said fibers exhibiting improved resin wettability and bondability.

32. A method of improving resin wettability and bondability of silica fibers containing at least 96% silica which method comprises the steps of coating said fibers with a composition consisting of phosphoric acid by contacting said fibers with said acid for a sufficient period of time to cover the entire surface of said fibers, and heating said fibers to a temperature of at least 1450° F. to cause formation of an improved surface layer on the fibers, which surface layer includes material derived from the phosphoric acid.

References Cited

UNITED STATES PATENTS

| | | | |
|---|---|---|---|
| 2,355,746 | 8/1944 | Nordberg et al. | 65—31 |
| 2,839,424 | 6/1958 | Labino | 117—126 |
| 3,082,133 | 3/1963 | Hoffmann et al. | 117—126 |
| 3,301,646 | 1/1967 | Smoot | 106—57 X |

ALFRED L. LEAVITT, *Primary Examiner.*

J. H. NEWSOME, *Assistant Examiner.*

U.S. Cl. X.R.

117—169, 138, 46, 54; 65—3; 106—57